United States Patent
Ott

(10) Patent No.: US 10,703,045 B2
(45) Date of Patent: Jul. 7, 2020

(54) DEVICE WITH HATCH FOR ADDITIVE MANUFACTURING

(71) Applicant: Siemens Aktiengesellschaft, Munich (DE)

(72) Inventor: Michael Ott, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/091,758

(22) PCT Filed: Apr. 18, 2017

(86) PCT No.: PCT/EP2017/059142
§ 371 (c)(1),
(2) Date: Oct. 5, 2018

(87) PCT Pub. No.: WO2017/194274
PCT Pub. Date: Nov. 16, 2017

(65) Prior Publication Data
US 2019/0160754 A1 May 30, 2019

(30) Foreign Application Priority Data
May 9, 2016 (DE) .......... 10 2016 207 896

(51) Int. Cl.
*B29C 64/379* (2017.01)
*B22F 3/105* (2006.01)
(Continued)

(52) U.S. Cl.
CPC .......... *B29C 64/379* (2017.08); *B22F 3/1055* (2013.01); *B29C 64/153* (2017.08);
(Continued)

(58) Field of Classification Search
None
See application file for complete search history.

(56) References Cited

U.S. PATENT DOCUMENTS 5,437,820 A 8/1995 Brotz
2012/0211155 A1 8/2012 Wehning et al.
(Continued)

FOREIGN PATENT DOCUMENTS

CN 105339154 A 2/2016
CN 205057060 U 3/2016
(Continued)

OTHER PUBLICATIONS

International search report with written opinion dated Jul. 3, 2017, for corresponding PCT/EP2017/059142.

*Primary Examiner* — Mary Lynn F Theisen
(74) *Attorney, Agent, or Firm* — Beusse Wolter Sanks & Maire

(57) ABSTRACT

A device for additive manufacturing, in particular powder-bed-based additive manufacturing, having a build-chamber wall, which defines a build chamber and is designed to separate the build chamber from an outside area. The build-chamber wall has a hatch, which is designed for transferring at least partially a component that is to be built up in layers from the build chamber through the hatch into an outside area during an additive manufacturing process, and the component can be built up along at least one transferring direction beyond a dimension of the build chamber. A corresponding method includes the provision of a first portion of the component to be manufactured in layers in the build chamber, and the building up in layers of a second portion, adjoining the first portion, wherein an already built-up sub-portion of the component is transferred in layers from the build chamber through the hatch into the outside area.

12 Claims, 1 Drawing Sheet

(51) Int. Cl.
*B33Y 30/00* (2015.01)
*B29C 64/153* (2017.01)
*B29C 64/20* (2017.01)
*B29C 64/371* (2017.01)
*B29C 64/25* (2017.01)
*B33Y 10/00* (2015.01)
*B33Y 80/00* (2015.01)
*B33Y 40/00* (2020.01)
*B29C 64/268* (2017.01)

(52) U.S. Cl.
CPC .............. *B29C 64/20* (2017.08); *B29C 64/25* (2017.08); *B29C 64/371* (2017.08); *B33Y 30/00* (2014.12); *B22F 2003/1056* (2013.01); *B29C 64/268* (2017.08); *B33Y 10/00* (2014.12); *B33Y 40/00* (2014.12); *B33Y 80/00* (2014.12); *Y02P 10/295* (2015.11)

(56) References Cited

U.S. PATENT DOCUMENTS

2014/0048971 A1 2/2014 Mannella et al.
2014/0291886 A1 10/2014 Mark et al.

FOREIGN PATENT DOCUMENTS

| | | |
|---|---|---|
| DE | 102004041633 A1 | 3/2006 |
| DE | 102011075748 A1 | 11/2012 |
| DE | 102011122141 A1 | 6/2013 |
| DE | 202013010698 A1 | 3/2015 |
| EP | 2289652 A1 | 3/2011 |
| EP | 2910362 A1 | 8/2015 |
| WO | 2008128502 A2 | 10/2008 |

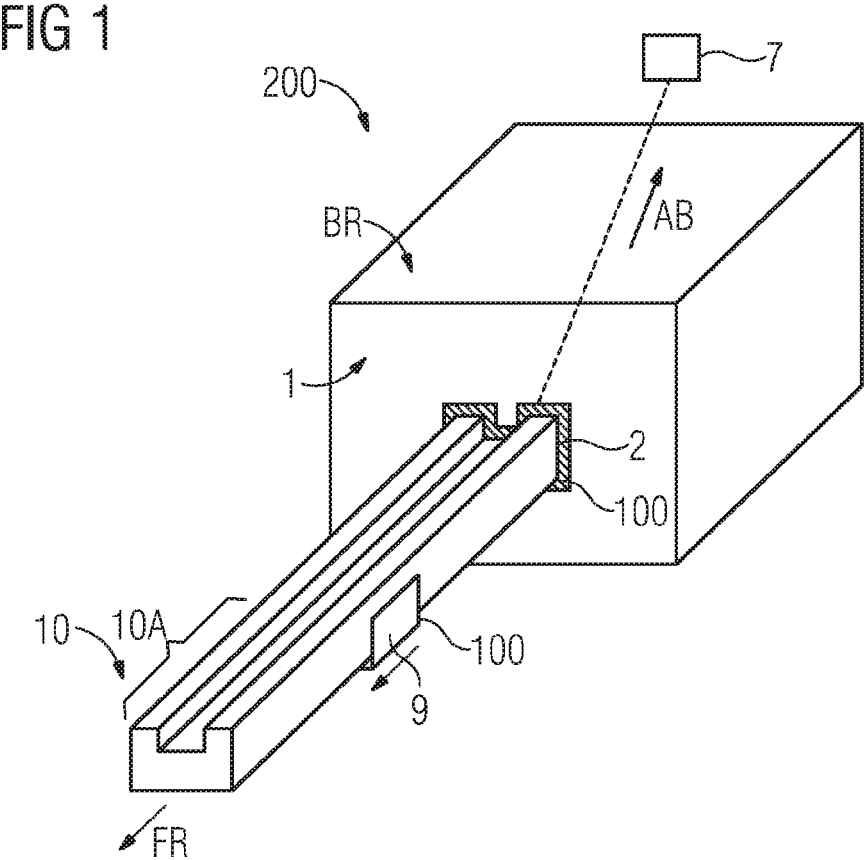
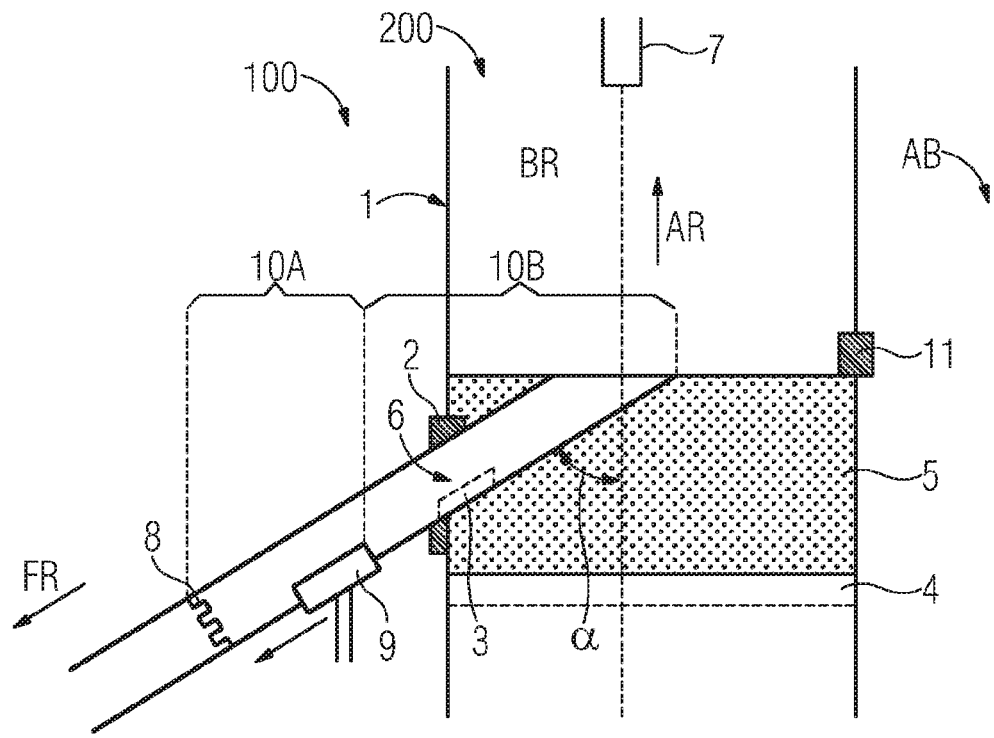

DEVICE WITH HATCH FOR ADDITIVE MANUFACTURING

CROSS REFERENCE TO RELATED APPLICATIONS

This application is the US National Stage of International Application No. PCT/EP2017/059142 filed Apr. 18, 2017, and claims the benefit thereof. The International Application claims the benefit of German Application No. DE 102016207896.8 filed May 9, 2016. All of the applications are incorporated by reference herein in their entirety.

FIELD OF INVENTION

The present invention relates to a device for the, in particular powder-bed-based, additive manufacturing of a component and to a system comprising the device. Also described are a corresponding method for the additive manufacturing of the component and a component which is produced or can be produced correspondingly.

The component can be provided for use in a turbomachine, in particular a gas turbine. In particular, the present invention further relates to components having a particularly large aspect ratio or components which are to be built up additively over a large length.

BACKGROUND OF INVENTION

Generative or additive manufacturing methods are, for example, laser deposition welding (LMD) or selective laser melting (SLM).

A method for the additive buildup of components by means of selective laser melting is known from EP 2 910 362 A1, for example.

To produce a component from a powder bed, for example by means of SLM, the powder bed is irradiated for example by a laser beam in accordance with the design of a corresponding CAD file.

Additive fabrication methods have proved to be particularly advantageous for complex components or components of complicated or delicate design, for example lightweight structures. Additive fabrication is particularly more advantageous owing to a particularly short chain of process steps, wherein a manufacturing or fabrication step of the corresponding component can occur directly on the basis of the CAD file.

Furthermore, additive fabrication is particularly advantageous for the development or production of prototypes which, for example for cost reasons, cannot be produced, or cannot be produced efficiently, by means of conventional subtractive or material-removing fabrication or casting methods.

At the current time, the designs of the components are limited, in particular in terms of their dimensions, by the design of the commercially available systems which in particular offer only a limited building space. Currently available SLM systems usually have fixed building space sizes. Typical dimensions for the building or manufacturing space are 250 mm×250 mm×250 mm, for example. The building space sizes can be (co-)determined, for example, by the size or area of a building platform.

At the current time, corresponding manufacturing systems are at any rate limited to a building volume of about 1000 mm×1000 mm×1000 mm. However, in particular in the case of the manufacture of long components or ones with an extent along mainly one axis, the complete building space area is not required. Consequently, a very large amount of powder has to be used for the manufacture of the corresponding component and in particular arranged or moved in the building space. Only a fraction of said powder is furthermore necessary for the actual buildup of the component. This constitutes a substantial disadvantage for the technology of additive manufacturing since the powder is not only expensive but any unnecessary (further) use of the powder can be disadvantageous for the component and also for the method. In particular, powder for each additive manufacturing process that is not processed to form the component is thermally loaded by the manufacturing conditions, for example by a laser, which can lead to an ageing process and thus to an impairment of the physical properties of the powder.

Furthermore, a large quantity of powder has to be kept in stock, for example, with it being the case that, during each (renewed) heating of the powder in the building space, the quality of the powder can be impaired by a partial oxidation and/or by the absorption of air moisture. This is particularly critical in the additive manufacturing of components for use in the hot gas path of a turbine, where even small quantities of oxygen can, for example, prevent the formation of desired or required material phases (for example the $\gamma$ or $\gamma'$ phase of a nickel- or cobalt-based superalloy).

SUMMARY OF INVENTION

It is therefore an object of the present invention to specify means by which the manufacture of components with a particularly large aspect ratio in at least one direction can be achieved in a particularly simple manner.

This object is achieved by the subject matter of the independent patent claims. Advantageous embodiments form the subject matter of the dependent patent claims.

One aspect of the present invention relates to a device for the additive manufacturing of one or more components. In particular, the device relates to a device for powder-bed-based manufacture.

The device comprises a building space wall which at least partially defines a building space, for example of a corresponding manufacturing system. The building space wall can be a partial wall of the building space. The building space wall is advantageously designed to separate the building space from an outside region and/or to define a geometry of the powder bed, wherein the building space wall has a hatch which is in turn designed to guide at least partially a component which is to be built up or to be manufactured in layers from the building space through the hatch into an outside region during an additive manufacturing operation, with the result that the component to be built up can be built up along at least one guide direction beyond a dimension of the building space.

Said guidance advantageously occurs along a guide direction.

The outside region is advantageously a region outside the building space which is, for example, continuously exposed to a surrounding atmosphere and advantageously not a process or manufacturing atmosphere, for example an inert gas.

The described device advantageously makes it possible to achieve a continuous and/or uninterrupted additive buildup of a component or of a chain of components, wherein the component or subportions thereof can be automatically discharged from the building space during the additive buildup. As a result, it is advantageously possible for the additive manufacturing, in particular the powder-bed-based manufacturing, of components to be correspondingly simplified in general and thus for the additive manufacturing technology to be decisively improved.

In one embodiment, the building space wall defines the building space laterally or along a periphery of the building space. This peripheral direction can be arranged or extend, for example, perpendicularly to a buildup direction of the component. Furthermore, the building space wall has an, in particular closable, opening through which the component to be built up in layers can be guided into the outside region.

In one embodiment, the hatch is designed to seal a component at least partially arranged in the opening with respect to a starting material, in particular a powder, for the component during the additive manufacturing operation and with respect to a manufacturing atmosphere. This embodiment is particularly expedient to hold the powder in the system and also to expediently prevent contact of the starting material with a surrounding atmosphere.

In one embodiment, the device has a guide which is designed to guide the component to be built up in layers along the guide direction from the building space into the outside region during the additive manufacturing operation, wherein the guide device encloses an angle of between 30 and 60° with a direction defined by a buildup direction of the method. According to this embodiment, the described "discharging" can be facilitated in a particularly expedient manner. In particular, the guiding-out or discharging of the component or its subregions with respect to the guide direction can be limited to an angle range (or corresponding spatial angle range) of more than 90° relative to the buildup direction. This applies in particular to powder-bed-based manufacturing methods which have a defined buildup direction.

In one embodiment, the guide functions as a supporting device for supporting a subportion of the component which has already been guided out into the outside region during the additive manufacturing operation.

In one embodiment, the guide is designed to correspondingly support the subportion.

In one embodiment, the device comprises a platform, for example an auxiliary platform, which is designed to serve as a substrate in an initial phase of the buildup in layers with the aid of the described device, wherein the platform is furthermore designed to be guided from the building space through the hatch into the outside region.

In one embodiment, the device furthermore comprises a fixing device which is designed to fix a component, which is already prefabricated but is for example furthermore to be built up in layers, for the buildup in layers in the building space.

A further aspect of the present invention relates to a system for additive manufacturing comprising or defining a building space, and a fusing device for fusing or building up the component, for example from the powder bed, and a slide for depositing layers of starting material for the buildup in layers.

A further aspect of the present invention relates to a method for the, in particular powder-bed-based, additive manufacturing of a component in the system, comprising the provision of a first portion of the component to be manufactured in layers in the building space and the subsequent buildup in layers of a second portion adjoining the first portion, wherein an already built-up subportion of the component is guided (guided out) in layers from the building space through the hatch into the outside region, in particular as soon as the first portion threatens to exceed the dimension of the building space.

The expression "in layers" means, in the context of guiding out the subportion, that the described guide for guiding the corresponding subportion is moved stepwise or in layers.

In one embodiment, the first portion of the component is built up in layers in the building space, in particular on a platform, without a subportion of the component being guided into the outside region in the process.

In one embodiment, the first portion of the component is a prefabricated component.

In one embodiment, a subportion of the component which has already been guided out from the building space into the outside region is guided in layers by a guide or supporting device along the guide direction and transferred or repositioned in layers to guide or support the component, advantageously during a coating operation of the method, for example by means of the described slide. For this purpose, the device can comprise a corresponding robot arm or gripper.

In one embodiment, the component is provided during the additive manufacturing operation with a predetermined breaking structure, for example comprising perforations or cavities, in such a way that a subportion of the component which has already been guided out from the building space into the outside region can be separated from the component for a continuous buildup in layers, for example perpendicularly to the guide direction. This embodiment advantageously makes it possible for an as it were unlimited number of components to be built up within a buildup step or process without the method having to be interrupted.

In one embodiment, new starting material for the component is continuously fed to the building space for a continuous buildup in layers. This embodiment also advantageously allows an additive buildup which is as flowing and continuous as possible.

A further aspect of the present invention relates to a component which is produced and/or can be produced according to the method, wherein the component has an aspect ratio of at least 3:1. Accordingly, a longitudinal axis of the component is expediently oriented along the guide direction.

Embodiments, features and/or advantages which in the present case relate to the device or the system can also relate to the method or the component, or vice versa.

BRIEF DESCRIPTION OF THE DRAWINGS

Further details of the invention will be described below with reference to the figures.

FIG. 1 shows a schematic perspective view of a device or system according to the invention for additive manufacturing.

FIG. 2 shows a schematic sectional or side view of the device or system from FIG. 1.

DETAILED DESCRIPTION OF INVENTION

Furthermore, on the basis of the figures, a method according to the invention for additive manufacturing and a component which is produced or can be produced correspondingly are described.

In the exemplary embodiments and figures, identical or identically acting elements can each be provided with the same reference signs. The illustrated elements and their mutual size ratios are fundamentally not to be considered as true to scale; rather, for better illustrability and/or for better understanding, individual elements may be illustrated as exaggeratedly thick or greatly dimensioned.

FIG. 1 shows a system 200. The system 200 is advantageously a system, in particular for the powder-bed-based, additive manufacturing of a component 10.

In the present case, the term "component" can be used to designate a component which at least partially is still to be built up and a ready-produced component.

The system 200 is advantageously a system for the additive manufacturing of components by means of selective laser melting (SLM), selective laser sintering (SLS) or electron beam melting (EBM). Alternatively, the device 100 or the system 200 can be designed for the additive manufacturing of components by means of deposition welding.

According to the present invention, the system 200 comprises a device 100 (cf. FIG. 2). The device 100 comprises a building space wall 1. The building space wall 1 can be a partial wall which at least partially defines a building space BR of the system 200. The building space wall 1 advantageously is or comprises a lateral wall which for example laterally delimits the building space BR and holds available a starting material (cf. reference sign 5) for the component.

The building space wall 1 furthermore comprises a hatch 2. The hatch 2 is advantageously designed to guide at least partially the component 10 to be built up or to be manufactured in layers from the building space BR through the hatch 2 into an outside region AB, i.e. a region outside the building space BR, during an additive manufacturing operation. In other words, the component is advantageously guided (out) from the building space BR through the hatch 2 into the outside region AB during the additive manufacturing operation. This expediently takes place along a guide direction FR (cf. FIG. 2).

The hatch expediently furthermore has an opening 6 for guiding out or guiding through the component 10.

The system 200 furthermore comprises a fusing device 7. The fusing device 7 can be a laser or electron beam unit for fusing a starting material (cf. reference sign 5 in FIG. 2). The fusing device 7 can be a beam melting or beam welding device for a corresponding additive manufacturing method. An energy beam, for example a laser or electron beam, is indicated by the dashed line as emanating from the fusing device 7.

It is furthermore shown in FIG. 1 that the component 10 is partially situated both in the building space BR and in the outside region AB. In particular, a portion 10A is shown outside the building space BR, whereas a region or subportion 10B is shown at least partially inside the building space BR.

The second portion 10 is arranged in the outside region AB, with it being the case that that region of the component 10 which—on account of its dimensions—no longer "fits" into the building space BR has been guided through the hatch 2 into the outside region AB.

The first portion 10A is advantageously dimensioned in such a way that it fits completely into the building space BR, or the component, while extending approximately over the region 10A, has been able to be completely built up within the building space BR.

The component 10 or at least a subportion (cf. reference signs 10A, 10B) thereof is advantageously guided from the building space BR through the hatch 2 into the outside region AB in such a way that at least the part of the component which is currently situated directly in the hatch 2 in the opening 6 is sealed with respect to a starting material 5, advantageously powder for the stated powder bed, with the result that no powder can pass from the building space BR into the outside region AB during the additive manufacturing operation.

Said seal can be realized, for example, by brushes which, for example, form the hatch 2 or are enclosed thereby. In particular, the opening can be provided on an inner side with said brushes (not explicitly indicated). For example, they can be metal brushes, advantageously even consisting of a high-heat-resistant metal, such as a superalloy. Furthermore, the brushes can advantageously be tailored to a cross section of the component which is advantageously guided through the opening 6 and thus produce a seal. FIG. 1 shows, for example, a polygonal cross section of the component 10 which has a rectangular contour and a recess (not further indicated). Alternatively, the component can have any desired cross-sectional shapes, for example can have a round cross section.

Furthermore, the component is correspondingly advantageously sealed with respect to a manufacturing atmosphere, for example containing an inert gas.

Said guiding-out has the advantage that, at least along the guide direction FR, the component can be manufactured so as, as it were, to be extended as desired, and in particular the building space BR does not constitute a limitation for the dimension of the component 10, as is the case in conventional devices or systems for additive manufacturing.

To facilitate guidance, the device 100 advantageously has a guide or guide device 9 which is designed to guide the component precisely along the guide direction FR and, where appropriate, advantageously also to support it.

The guide 9 can constitute a movement actuator or a support for guiding at least the portion 10B of the component 10 stepwise or in layers.

The guide direction FR advantageously encloses an angle of between 30 and 60° with a vertical axis or an axis defined by the buildup direction AB of the powder-bed-based method.

FIG. 2 shows a schematic sectional view of the device 100 or system 200 and of the method according to the invention, in particular a powder-bed-based additive manufacturing method, wherein individual aspects are clearly illustrated by contrast with FIG. 1.

It is shown in FIG. 2 that the building space BR for the additive buildup of the component 10 from a powder bed is partially filled with a granular or pulverulent starting material 5, in particular powder. Alternatively, the starting material can correspondingly be arranged below the actual building space BR on a building platform 4.

It can furthermore be seen in FIG. 2 that the guide direction FR encloses an angle $\alpha$ to an axis defined by the buildup direction AR. This embodiment implies the formation of an angle of more than 90° between the guide direction FR and a buildup direction AR which can be necessary in particular in the case of powder-bed-based methods.

In order to deposit the starting material 5 or powder, the system 200 advantageously has a slide 11 which, after each fusion or illumination step by means of the fusing device 7, deposits new powder from a powder supply (not explicitly illustrated) in layers or distributes it on the component 10.

In conventional systems, subsequent to the coating, the building platform 4 is advantageously lowered by a length corresponding to the deposited and/or fused layer thickness.

The additive manufacturing according to the invention of the component 10 is described below:

The features of the present invention are particularly expedient in the case of components which have a particularly large aspect ratio, for example an aspect ratio of at least 3 to 1 (3:1), advantageously 10 to 1 or more. In other words, the components according to the invention or components manufactured by means of the device 100 are advantageously particularly long, advantageously longer than the dimensions of the building space BR along the guide direction FR.

According to the method according to the invention, it is advantageously at first the case that a first (sub)portion 10A of the component 10 is, advantageously completely, built up or manufactured in the building space BR from the powder bed. In the illustration of FIG. 2, on account of the advanced stage of the additive manufacturing, this portion has already been guided out completely from the building space BR into the outside region AB.

For an initial phase of the additive buildup, the device 100 advantageously has a platform or auxiliary platform 3 which can serve as a substrate in this phase, advantageously for the powder-bed-based manufacturing.

The platform 3 can be provided, for example, in addition to the described further building platform 4, wherein the building platform 4 is advantageously a customary or conventional platform.

The reference sign 3 indicates the position of the platform 3 in an initial phase of the manufacturing method by way of dashed lines. The deposited material (fused starting material) for the component 10 is advantageously connected to the platform 3 in an integrally bonded manner. After the additive buildup, the platform can advantageously be separated again from the component structure by appropriate means.

The aforementioned guide 9 can furthermore comprise the platform 3 or be coupled or connected thereto.

As soon as a specified dimension of the component 10 is intended to be built up during the additive manufacturing, that is to say beyond the building space wall 1, a corresponding subregion of the component is expediently guided through the hatch 2, i.e. is guided out from the building space BR into the outside region AB via the guide 9 and/or the platform 3. This advantageously occurs simultaneously during the additive manufacturing and advantageously stepwise or in layers.

Whereas in conventional systems the further platform 4 is lowered by the extent corresponding to the deposited layer thickness, in the present case the guide 9 is moved stepwise by a corresponding length further along the guide direction FR stepwise.

The guide 9 can comprise a gripper and/or a robot arm, for example. The guide 9 and/or the stated gripper are/is advantageously designed in such a way that the latter can be transferred or repositioned to support a subportion of the component 10 that is already guided out of the building space BR if the guided-out portion becomes too long and threatens to bend or break. Said transfer advantageously takes place during a coating phase, i.e. during the deposition by means of the slide 11 of a new layer of starting material 5 that is then to be fused, in order to advantageously allow the additive buildup to proceed in a time-efficient and expedient manner.

For support purposes, it is possible according to the invention also for a plurality of guide devices or gripper devices to be provided in the device 100.

As an alternative to the complete additive fabrication of the component 10, the component 10 or a portion thereof can also be manufactured starting from a prefabricated component. The dimension of this prefabricated component is advantageously not larger than the above-described portion 10A and/or not larger than the building space BR, with the result that this component can be arranged in the building space BR in the initial phase of the additive buildup.

To fix the prefabricated component or the prefabricated component part, the device 100 can be correspondingly fixed in the building space BR, for example by means known to a person skilled in the art.

According to the present invention, the component can—by contrast to conventional manufacturing methods or systems—advantageously be built up with unlimited length or extent along the guide direction FR.

For this purpose, the described system 200 advantageously comprises a continuous powder feed or a corresponding device (not explicitly illustrated) by means of which, for example, the additive manufacturing process does not have to be interrupted by the filling of corresponding powder containers.

In this context, the present invention allows a kind of "assembly line manufacture" of components of identical type in that the manufactured or built-up structure is advantageously provided with a predetermined breaking structure 8 (predetermined breaking point) at separating points of adjacently built-up components during the additive manufacturing operation. Likewise during the additive manufacturing operation it is then possible for individual subportions to be successively mechanically separated as separate components, for example, in a simple manner.

The invention is not restricted by the description on the basis of the exemplary embodiments to these embodiments but comprises any novel feature and any combination of features. This includes in particular any combination of features in the patent claims, even if this feature or this combination itself is not explicitly specified in the patent claims or exemplary embodiments.

The invention claimed is:

1. A device for additive manufacturing, comprising:
   a building space wall which defines a building space and is designed to separate the building space from an outside region,
   wherein the building space wall has a hatch which is designed to guide at least partially a component to be built up in layers from the building space through the hatch into an outside region during an additive manufacturing operation, with the result that the component is built up along at least one guide direction beyond a dimension of the building space,
   wherein the building space wall laterally defines the building space,
   wherein the building space wall has an opening through which the component is guided into the outside region, and
   wherein the hatch is designed to seal a component arranged at least partially in the opening with respect to a starting material for the component during the additive manufacturing and with respect to a manufacturing atmosphere.

2. The device as claimed in claim 1, further comprising:
   a guide designed to guide the component along the guide direction from the building space into the outside region during the additive manufacturing operation,
   wherein the guide encloses an angle of between 30 and 60° with a direction defined by a buildup direction.

3. The device as claimed in claim 2,
   wherein the guide functions as a supporting device and is designed to support a subportion of the component which has already been guided out into the outside region during the additive manufacturing operation.

4. The device as claimed in claim 1, further comprising:
a platform which is designed to serve as a substrate in an initial phase of the buildup of the component in layers, wherein the platform is further designed to be guided from the building space through the hatch into the outside region.

5. A system for additive manufacturing, comprising:
the device as claimed in claim 1,
a building space,
a fusing device for building up the component, and
a slide for depositing layers of starting material for the buildup in layers.

6. A method for powder-bed-based, additive manufacturing of a component by the device as claimed in claim 1, the method comprising:
providing a first portion of the component to be manufactured in layers in the building space, and
building up a second portion in layers, said portion adjoining the first portion, wherein an already built-up subportion of the component is guided in layers from the building space through the hatch into the outside region.

7. The method as claimed in claim 6,
wherein the first portion of the component is built up in layers in the building space without a subportion of the component being guided into the outside region in the process.

8. The method as claimed in claim 6,
wherein the first portion of the component is a prefabricated component.

9. The method as claimed in claim 6,
wherein a subportion of the component which has already been guided out from the building space into the outside region is guided in layers along the guide direction by a guide and transferred in layers to guide the component.

10. The method as claimed in claim 6,
wherein the component is provided with a predetermined breaking structure during the additive manufacturing in such a way that a subportion of the component which has already been guided out from the building space into the outside region can be separated from the component for a continuous buildup in layers.

11. The method as claimed in claim 6,
wherein new starting material for the component is continuously fed to the building space for a continuous buildup in layers.

12. The method as claimed in claim 6, further comprising:
providing a building space, a fusing device for building up the component, and a slide for depositing layers of starting material for the buildup in layers.

* * * * *